US010461522B2

(12) United States Patent
Aramaki

(10) Patent No.: US 10,461,522 B2
(45) Date of Patent: Oct. 29, 2019

(54) PROTECTION DEVICE AND PROTECTION SYSTEM

(71) Applicant: MITSUBISHI ELECTRIC CORPORATION, Chiyoda-ku, Tokyo (JP)

(72) Inventor: Takuo Aramaki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 307 days.

(21) Appl. No.: 15/542,334

(22) PCT Filed: Feb. 13, 2015

(86) PCT No.: PCT/JP2015/053929
§ 371 (c)(1),
(2) Date: Jul. 7, 2017

(87) PCT Pub. No.: WO2016/129094
PCT Pub. Date: Aug. 18, 2016

(65) Prior Publication Data
US 2018/0278046 A1    Sep. 27, 2018

(51) Int. Cl.
*H02H 7/00*     (2006.01)
*H02H 7/125*    (2006.01)
(Continued)

(52) U.S. Cl.
CPC ........... *H02H 7/1255* (2013.01); *H02H 7/12* (2013.01); *H02M 7/12* (2013.01); *H02M 7/48* (2013.01);
(Continued)

(58) Field of Classification Search
None
See application file for complete search history.

(56) References Cited

U.S. PATENT DOCUMENTS 6,434,025 B2 * 8/2002 Shirai .................. H02M 1/32
                                                        363/21.1
8,854,845 B2 * 10/2014 Wilmot ................ H02H 9/041
                                                        323/329
2010/0176816 A1    7/2010 Horowy et al.

FOREIGN PATENT DOCUMENTS

JP      8-191168 A      1/1996
JP      2001-169533 A   6/2001
(Continued)

OTHER PUBLICATIONS

International Search Report (PCT/ISA/210) dated Apr. 14, 2015, by the Japanese Patent Office as the International Searching Authority for International Application No. PCT/JP2015/053929.
(Continued)

*Primary Examiner* — Stephen W Jackson
(74) *Attorney, Agent, or Firm* — Buchanan Ingersoll & Rooney PC

(57) ABSTRACT

A protection device for a power converter provided between an AC system and a DC power transmission system is configured to: receive an input of an AC current value obtained between a transformer connected to the AC system and the power converter capable of converting AC power into DC power; receive an input of a change rate of a direct current detected by a Rogowski coil provided between a DC line and the power converter, the DC line receiving DC power from the power converter; determine based on the AC current value and the change rate whether a fault occurs or not in one of the power converter and the DC line; and output information for protecting the power converter based on a determination result.

8 Claims, 7 Drawing Sheets

(51) Int. Cl.
  *H02H 7/12* (2006.01)
  *H02M 7/12* (2006.01)
  *H02M 7/48* (2007.01)
  *H02M 7/72* (2006.01)
  *H04B 3/00* (2006.01)
  *H02M 7/797* (2006.01)

(52) U.S. Cl.
  CPC ............... *H02M 7/72* (2013.01); *H04B 3/00* (2013.01); *H02M 7/797* (2013.01)

(56) References Cited

FOREIGN PATENT DOCUMENTS

| | | |
|---|---|---|
| JP | 2001-178148 A | 6/2001 |
| JP | 2006-288099 A | 10/2006 |
| JP | 2011-45232 A | 3/2011 |
| JP | 2013-231601 A | 11/2013 |
| JP | 2014-93830 A | 5/2014 |

OTHER PUBLICATIONS

Written Opinion (PCT/ISA/237) dated Apr. 14, 2015, by the Japanese Patent Office as the International Searching Authority for International Application No. PCT/JP2015/053929.

* cited by examiner

PROTECTION DEVICE AND PROTECTION SYSTEM

TECHNICAL FIELD

The present disclosure relates to a protection device and a protection system, and particularly to a protection device for a power converter provided between an alternating-current (AC) system and a direct-current (DC) power transmission system, and a protection system for the DC power transmission system.

BACKGROUND ART

Power converters formed using power switching elements have been expanded in applicable range in accordance with the increased capacity and speed of such switching elements. Examples of power switching elements may be an Insulated Gate Bipolar Transistor (IGBT), a metal-oxide-semiconductor field-effect transistor (MOSFET) and the like. As a protection device for such a power converter, the technique employing a Rogowski coil is disclosed.

Japanese Patent Laying-Open No. 2001-169533 (PTD 1) discloses a power conversion apparatus in which a Rogowski coil is applied to form a protection device for a switching element. This power conversion apparatus includes: a Rogowski coil configured to detect a temporal change in a main circuit current flowing through the switching element; and a short circuit detector configured to detect based on a terminal voltage on this Rogowski coil that a short-circuit current flows through the switching element.

CITATION LIST

Patent Document

PTD 1: Japanese Patent Laying-Open No. 2001-169533

SUMMARY OF INVENTION

Technical Problem

For example, the power converter as described above is applied to a DC power transmission system in order to carry out conversion between AC power and DC power. In the DC power transmission system, a large current flows through a DC line and a power converter upon occurrence of a fault inside the power converter or on the DC line. Accordingly, it is desired to detect and remove a fault more accurately and speedily in order to prevent damage from occurring in the switching element inside the power converter.

As described above, the power converter disclosed in PTD 1 is provided with a Rogowski coil for detecting a temporal change in the current flowing through the power converter for the purpose of protecting this power converter. However, for example, in the DC power transmission system formed using a self-excited power converter, the current flowing through the power converter includes not only a DC component but also an AC component. Accordingly, this DC power transmission system is always influenced by the temporal change in the AC component, which poses a problem that a fault determination in the power converter cannot be accurately made only by a Rogowski coil.

The present disclosure has been made in light of the above-described problems. An object in an aspect is to provide: a protection device and a protection system for the DC power transmission system that are capable of detecting and removing a fault more accurately and speedily in order to protect a power converter provided between an AC system and a DC power transmission system.

Solution to Problem

According to an embodiment, a protection device for a power converter provided between an AC system and a DC power transmission system is provided. The protection device includes: a current input unit configured to receive an input of an AC current value obtained between a transformer connected to the AC system and the power converter capable of converting AC power into DC power; a current change rate input unit configured to receive an input of a change rate of a direct current detected by an air core coil provided between a DC line and the power converter, the DC line receiving DC power from the power converter; a fault determination unit configured to determine whether a fault occurs or not in one of the power converter and the DC line, based on the AC current value received by the current input unit and the change rate received by the current change rate input unit; and an output unit configured to output information for protecting the power converter based on a determination result of the fault determination unit.

Advantageous Effects of Invention

According to the present disclosure, it becomes possible to detect and remove a fault more accurately and speedily in order to protect a power converter provided between an AC system and a DC power transmission system.

DESCRIPTION OF EMBODIMENTS

Figure 1:
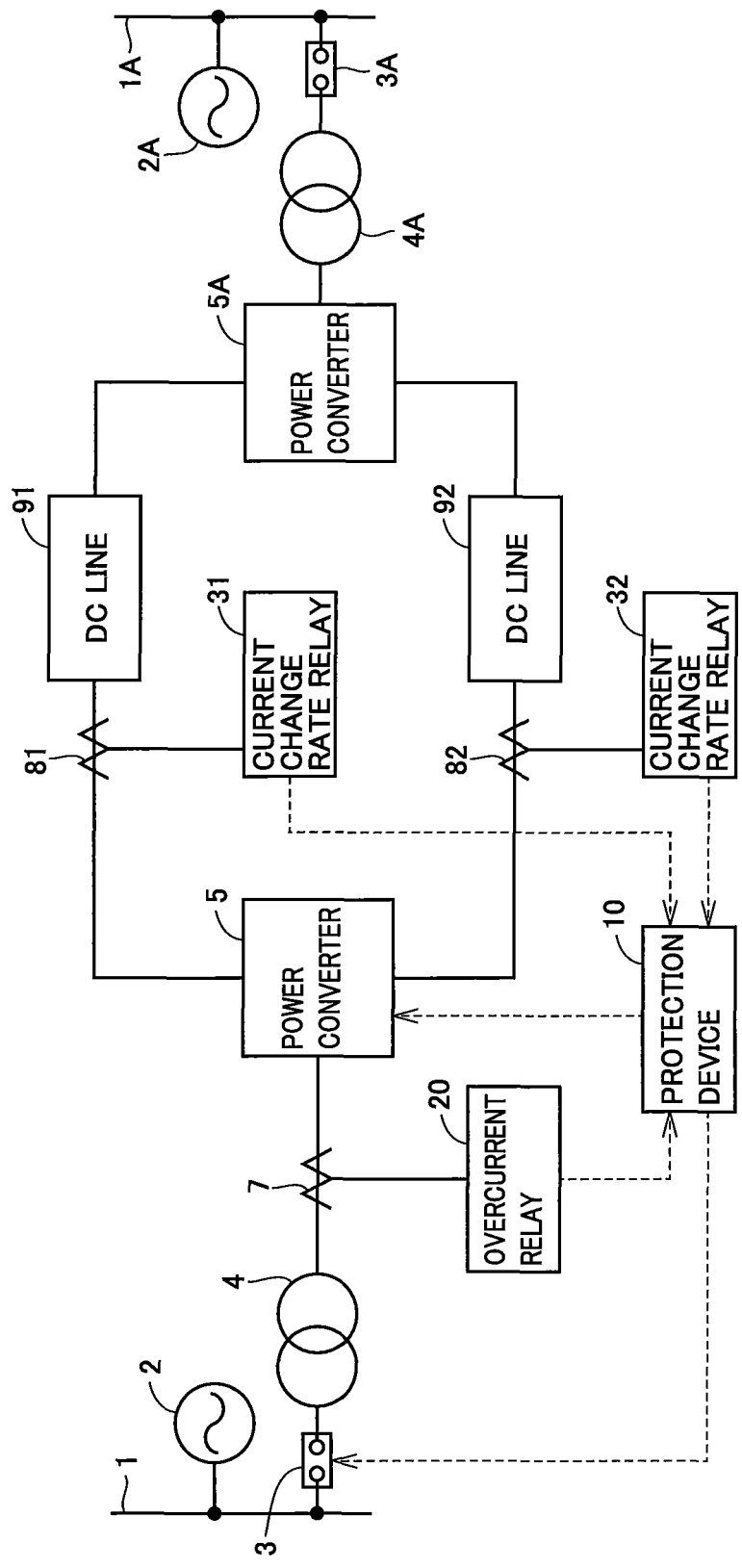
FIG. 1 is a diagram showing an example of the entire configuration of a protection system for a DC power transmission system according to the present embodiment.

The embodiments of the present invention will be hereinafter described with reference to the accompanying drawings. In the following description, the same components are designated by the same reference characters. Names and functions thereof are also the same. Accordingly, the detailed description thereof will not be repeated.

<Entire Configuration>

FIG. 1 is a diagram showing an example of the entire configuration of a protection system for a DC power transmission system according to the present embodiment. Referring to FIG. 1, a DC power transmission system serves as a two-terminal DC power transmission system in which AC systems 2 and 2A respectively connected to AC buses 1 and 1A are linked to each other through DC lines 91 and 92.

AC bus 1 is connected to the AC terminal of power converter 5 through a circuit breaker 3 and a transformer 4. AC bus 1A is connected to the AC terminal of a power converter 5A through a circuit breaker 3A and a transformer 4A.

Power converter 5 is provided between AC system 2 and DC lines 91, 92 serving as power lines in the DC power transmission system. Power converter 5A is provided between AC system 2A and DC lines 91, 92 serving as power lines in the DC power transmission system. Specifically, DC line 91 is connected to the positive-side terminal of each of power converters 5 and 5A while DC line 92 is connected to the negative-side terminal of power converter 5. For example, when power converters 5 and 5A function as a forward converter and a reverse converter, respectively, the AC power from transformer 4 is converted into DC power by power converter 5, and this converted DC power is DC-transmitted through DC lines 91 and 92. Then, at the receiving end, the DC power is converted into AC power by power converter 5A and supplied to transformer 4A. In addition, when power converters 5 and 5A function as a forward converter and a reverse converter, respectively, the conversion operation is performed in the manner inversely to the operation as described above.

Power converters 5 and 5A each are formed of a self-excited voltage-type power converter that is capable of independently controlling active power and reactive power. Each of power converters 5 and 5A is formed of a component unit as a cell that is formed, for example, of two switching elements including an IGBT as one example of a transistor element and a diode connected in anti-parallel to this IGBT. These two switching elements are connected in series and a capacitor is connected to each of both ends of the switching elements connected in series. The terminal extending out from each of both ends of the switching elements serves as a cell terminal.

A current detector 7 is provided between transformer 4 and power converter 5. Current detector 7 detects an AC current flowing between transformer 4 and power converter 5, and inputs the current value of the AC current into an overcurrent relay 20. Overcurrent relay 20 transmits the information showing the input current value to a protection device 10. Typically, the information is transmitted as digital information for specifying a current value. Overcurrent relay 20 is formed of an AC overcurrent relay or a ground fault overcurrent relay, for example.

A Rogowski coil 81 is provided between power converter 5 and DC line 91 while a Rogowski coil 82 is provided between power converter 5 and DC line 92. Unlike a Hall CT or the like, such a Rogowski coil is an air core coil not including an iron core, so that it can achieve quick response speed and also can be reduced size and weight. Furthermore, such a Rogowski coil is higher in output voltage level than a Hall CT and also does not require microscopic electronic components such as a Hall element. Thus, such a Rogowski coil is excellent in noise resistance and less influenced by a temperature change and the like.

Current change rate relay 31 receives an input of the voltage between the terminals of Rogowski coil 81 while current change rate relay 32 receives an input of the voltage between the terminals of Rogowski coil 82. The voltage between the terminals of the Rogowski coil is proportional to the change rate of the current. Accordingly, current change rate relay 31 can detect the change rate of the direct current between power converter 5 and DC line 91 while current change rate relay 32 can detect the change rate of the direct current between power converter 5 and DC line 92. Current change rate relays 31 and 32 each are a DC overcurrent relay, for example.

Furthermore, current change rate relays 31 and 32 transmit information showing their respective change rates to protection device 10. Typically, the information is transmitted as digital information for specifying the detected change rate.

Protection device 10 performs a process for protecting power converter 5 (and DC lines 91 and 92) based on the information transmitted from overcurrent relay 20 and current change rate relays 31 and 32. For example, protection device 10 determines based on the information whether a fault has occurred or not in one of power converter 5 and DC lines 91, 92. If a fault has occurred, protection device 10 transmits an operation stop command to power converter 5, and then, transmits an interruption command to circuit breaker 3. Specific details of the process performed by protection device 10 will be described later.

Typically, protection device 10 is formed of a microcomputer as a main body and includes a Central Processing Unit (CPU) that is not shown. Also, protection device 10 is implemented by the CPU executing the data and the program stored in a memory such as a ROM (Read Only Memory) and a RAM (Random Access Memory) that are not shown. In addition, protection device 10 may be formed of hardware such as a circuit for implementing the process based on the instruction executed by the CPU.

<Outline of Operation>

Then, the outline of the operation of a protection system for a DC power transmission system having the configuration as described above will be hereinafter described. First, an explanation will be given with regard to the outline of the operation of the protection system, which is performed when a fault occurs in DC line 91 or DC line 92. For the sake of simplicity of description, the following is an explanation about the case where a fault occurs in DC line 91 at time t1.

Referring to FIG. 1, when a fault occurs in DC line 91, a current flowing through DC lines 91 and 92 suddenly increases. Specifically, the current flowing from the power converter 5 side to the DC line 91 side suddenly increases. At this time, a sudden increase in current is detected in current detector 7 while a sudden change in voltage between terminals is detected in each of Rogowski coils 81 and 82.

Figure 2:
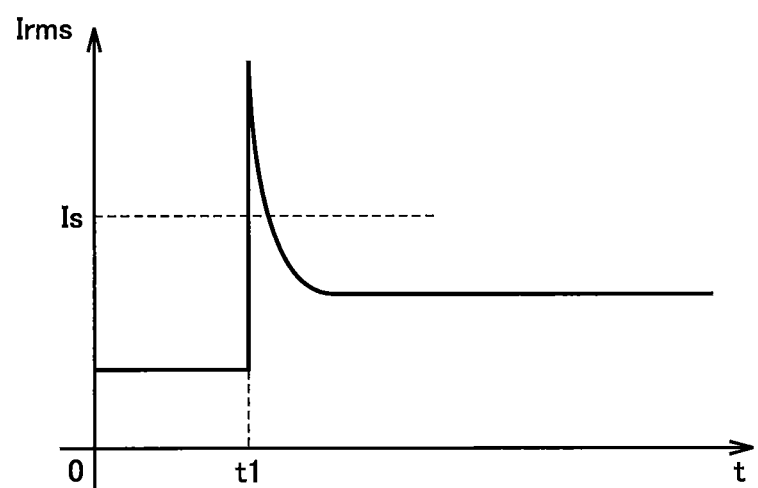
FIG. 2 is a diagram for illustrating the operation of the protection system according to the present embodiment.

FIG. 2 is a diagram for illustrating the operation of the protection system according to the present embodiment. Specifically, in FIG. 2, the horizontal axis shows time t and the vertical axis shows an effective value Irms of the AC current flowing between transformer 4 and power converter 5. Referring to FIG. 2, it turns out that effective value Irms suddenly increases at time t1 at which a fault occurs.

Figure 3:
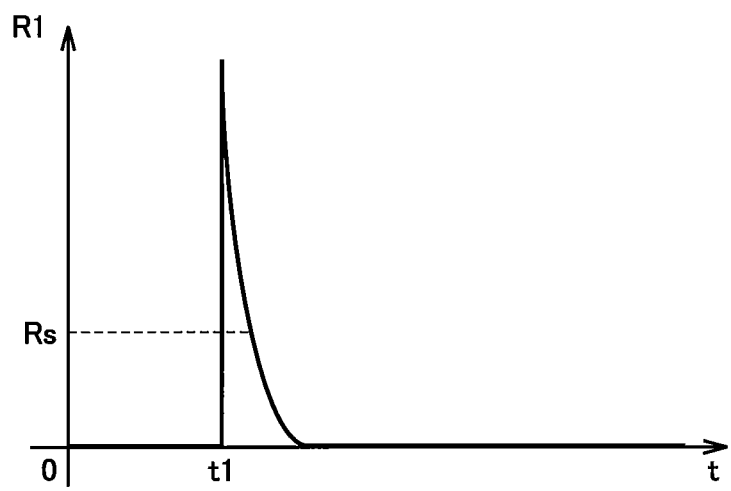
FIG. 3 is a diagram for illustrating the operation of the protection system according to the present embodiment.

FIG. 3 is a diagram for illustrating the operation of the protection system according to the present embodiment. Specifically, in FIG. 3, the horizontal axis shows time t while the vertical axis shows a current change rate R1 of the direct current flowing between power converter 5 and DC line 91. A current change rate R2 of the direct current flowing between power converter 5 and DC line 92 also shows a similar tendency. In the present embodiment, the direction in which a current flows from power converter 5 into DC line 91 is defined as a positive direction while the direction in which a current flows from DC line 91 into power converter 5 is defined as a negative direction. In this case, the direction in which a current flows from DC line 92 into power converter 5 is defined as a positive direction while the direction in which a current flows from power converter 5 into DC line 92 is defined as a negative direction.

Referring to FIG. 3, it turns out that current change rate R1 suddenly changes in the positive direction at time t1 at which a fault occurs (in other words, the voltage between the terminals in Rogowski coil 81 suddenly changes in the positive direction).

Again referring to FIG. 1, protection device 10 receives, through overcurrent relay 20, an input of the information showing the AC current value obtained between transformer 4 and power converter 5 (in this case, the information showing effective value Irms) and also receives, through current change rate relay 31, an input of the information showing current change rate R1 of the direct current flowing between power converter 5 and DC line 91. Based on the above-described information, protection device 10 determines that effective value Irms is equal to or greater than a reference threshold value Is, and that the absolute value of current change rate R1 is equal to or greater than a reference change rate Rs. Furthermore, protection device 10 determines that the current flowing from power converter 5 into DC line 91 has increased since the polarity of current change rate R1 is positive.

In view of the above, protection device 10 determines that a fault has occurred in DC line 91. Then, protection device 10 transmits an operation stop command to power converter 5 and transmits an interruption command to circuit breaker 3. Specifically, protection device 10 transmits an operation stop command to power converter 5 before it transmits an interruption command to circuit breaker 3. Accordingly, after the operation of power converter 5 is stopped, circuit breaker 3 is opened and power converter 5 is disconnected from AC system 2. Thereby, the DC power transmission system can be prevented from being adversely influenced by opening of circuit breaker 3 during the operation of power converter 5.

In addition, protection device 10 may simultaneously transmit the stop command and the interruption command to power converter 5 and circuit breaker 3, respectively. Also in this case, it takes time to bring circuit breaker 3 from the closed state into the opened state. Accordingly, after the operation of power converter 5 is stopped, circuit breaker 3 is opened and power converter 5 is disconnected from AC system 2. Also, protection device 10 may causes a display (not shown) or the like to show that a fault has occurred in DC line 91.

Then, an explanation will be hereinafter given with regard to the outline of the operation of the protection system in the case where a fault has occurred inside power converter 5. The following is an explanation about the case where a fault has occurred inside power converter 5 at time t1.

Figure 4:
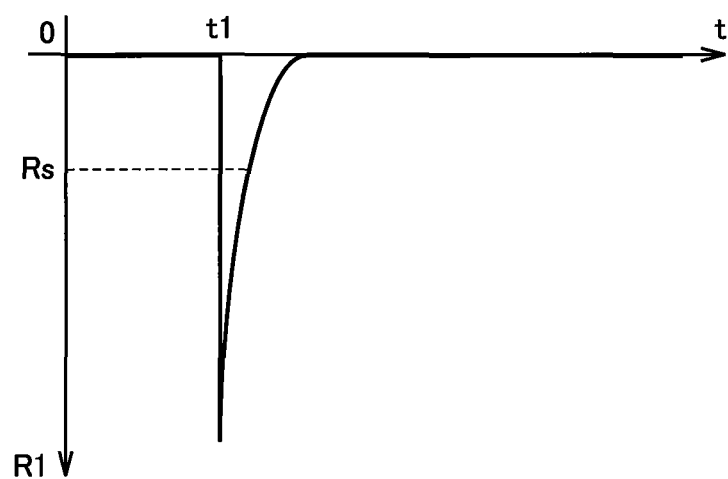
FIG. 4 is a diagram for illustrating the operation of the protection system according to the present embodiment.

Referring to FIG. 1, when a fault occurs inside power converter 5, the current flowing from DC line 91 into power converter 5 suddenly increases. At this time, a sudden current increase as shown in FIG. 2 is detected in current detector 7 as in the case where a fault occurs in DC line 91. In other words, effective value Irms suddenly increases at time t1. In addition, a sudden change in voltage between the terminals is also detected in Rogowski coils 81 and 82. As shown in FIG. 4, such a voltage change occurs in the direction opposite to the direction shown in FIG. 3.

FIG. 4 is a diagram for illustrating the operation of the protection system according to the present embodiment. Specifically, in FIG. 4, the horizontal axis shows time t and the vertical axis shows current change rate R1 of the direct current flowing between power converter 5 and DC line 91. Current change rate R2 of the direct current flowing between power converter 5 and DC line 92 also shows a similar tendency. Referring to FIG. 4, it turns out that current change rate R1 suddenly changes in the negative direction at time t1 (that is, the voltage between the terminals of Rogowski coil 81 suddenly changes in the negative direction).

Again referring to FIG. 1, protection device 10 receives, through overcurrent relay 20, an input of the information showing an AC current value obtained between transformer 4 and power converter 5 (in this case, the information showing effective value Irms), and also receives, through current change rate relay 31, an input of the information showing current change rate R1 of the direct current flowing between power converter 5 and DC line 91. Based on the above-described information, protection device 10 determines that effective value Irms is equal to or greater than reference threshold value Is, and the absolute value of current change rate R1 is equal to or greater than reference change rate Rs. Also, protection device 10 determines that the current flowing from DC line 91 into power converter 5 has increased since the polarity of current change rate R1 is negative.

In view of the above, protection device 10 determines that a fault has occurred inside power converter 5. Then, protection device 10 transmits an operation stop command to power converter 5, and transmits an interruption command to circuit breaker 3. Thereby, after the operation of power converter 5 is stopped, circuit breaker 3 is opened and power converter 5 is disconnected from AC system 2. Also, protection device 10 may cause a display or the like to show, for example, that a fault has occurred inside power converter 5.

As described above, when protection device 10 detects occurrence of a fault on DC lines 91 and 92 or inside power converter 5, it stops the operation of power converter 5 before it opens circuit breaker 3, so that power converter 5 can be prevented from being damaged by a fault current.

Furthermore, protection device 10 determines occurrence of a fault in consideration of: the current value of the AC current flowing between transformer 4 and power converter 5; and the change rate of the direct current flowing between power converter 5 and DC lines 91, 92, with the result that a fault can be more accurately detected. Furthermore, based on the direction of change in the direct current flowing between power converter 5 and DC lines 91, 92, protection device 10 can also determine whether a fault section is located on DC lines 91, 92 or inside power converter 5. Thereby, protection device 10 can reliably detect a fault in the DC lines and the power converter to remove a fault section.

Furthermore, since a Rogowski coil as an air core coil is used for detecting the change rate of the direct current, a fault determination can be made more speedily, for example, than the case where a DC transformer or the like is used. In particular, since power converter 5 is a self-excited power converter, a current flowing upon occurrence of a fault rises sharply as compared with a separately-excited power converter. Thus, it is required to speedily determine a fault. According to protection device 10, since it employs a Rogowski coil allowing a quick response speed, a fault determination can be speedily made, with the result that self-excited power converter 5 can be reliably prevented from being damaged. Furthermore, since a fault determination can be speedily made, it becomes possible to minimize a fault influence spreading to a sound power system caused by occurrence of a fault.

<Functional Configuration>

Figure 5:
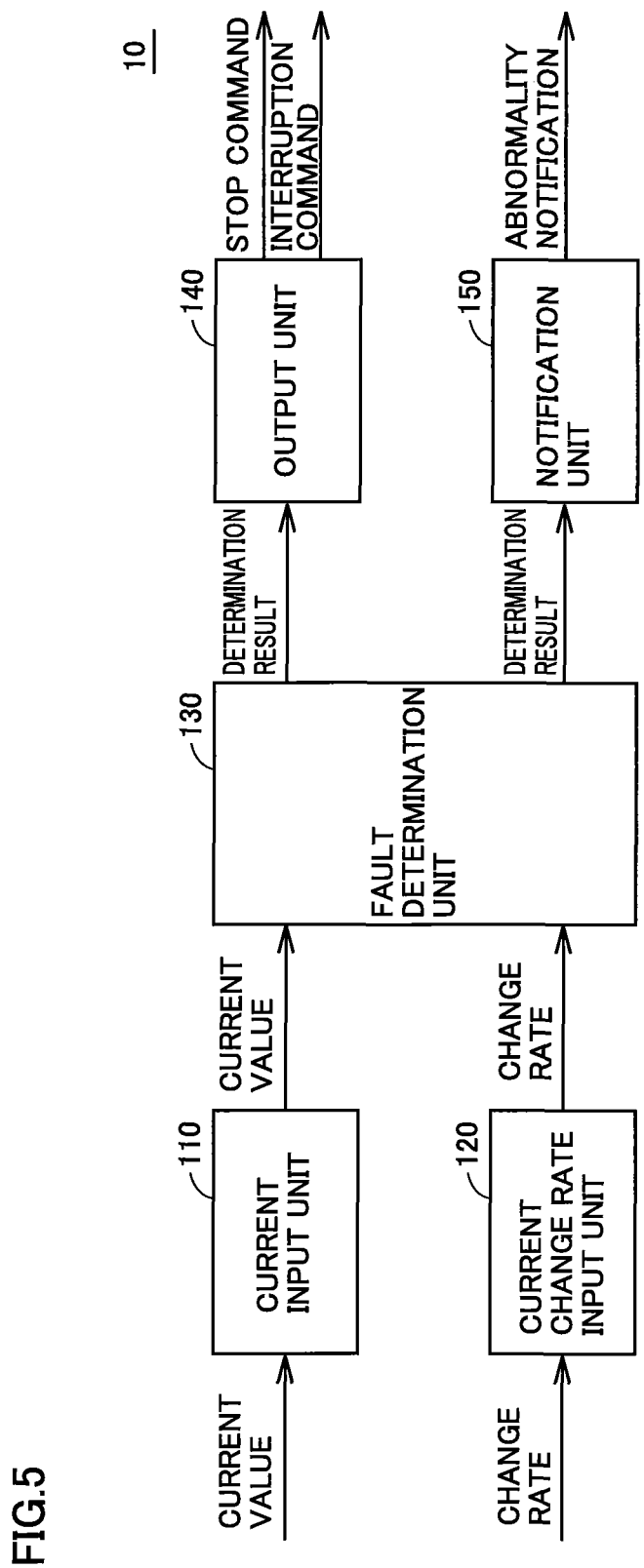
FIG. 5 is a functional block diagram of a protection device according to the present embodiment.

FIG. 5 is a functional block diagram of protection device 10 according to the present embodiment. Referring to FIG. 5, protection device 10 includes a current input unit 110, a current change rate input unit 120, a fault determination unit 130, an output unit 140, and a notification unit 150. Each of these functions is implemented by a CPU of protection device 10 executing a program stored in a ROM. In addition, some or all of these functions may be configured so as to be implemented by hardware.

Current input unit 110 receives an input of the AC current value obtained between transformer 4 connected to AC system 2 and power converter 5 capable of converting AC power into DC power. Specifically, current input unit 110 receives the information showing the AC current value (for example, the effective value of the AC current) from overcurrent relay 20.

Current change rate input unit 120 receives inputs of: the change rate of the direct current detected by Rogowski coil 81 provided between DC line 91 and power converter 5; and the change rate of the direct current detected by Rogowski coil 82 provided between DC line 92 and power converter 5. Specifically, current change rate input unit 120 receives these change rates through current change rate relays 31 and 32.

Based on the AC current value received by current input unit 110 and the change rate received by current change rate input unit 120, fault determination unit 130 determines whether a fault has occurred or not in one of power converter 5 and DC lines 91, 92. Specifically, when the AC current value is equal to or greater than reference threshold value Is and the change rate is equal to or greater than reference change rate Rs, fault determination unit 130 determines that a fault has occurred in power converter 5 or in DC lines 91 and 92. In addition, reference threshold value Is and reference change rate Rs are stored in a memory of protection device 10 in advance. Also, using the change rate of the direct current detected by each of Rogowski coils 81 and 82 allowing quick response speed, fault determination unit 130 determines whether a fault has occurred or not in one of power converter 5 and DC lines 91, 92. Accordingly, this determination can be speedily made.

Fault determination unit 130 can also determine based on the polarity of the change rate whether a fault has occurred in power converter 5 or DC line 91 (in this case, it is assumed that no fault occurs in DC line 92). For example, when the change rate is positive (when the current flowing from power converter 5 into DC line 91 increases), fault determination unit 130 determines that a fault has occurred in DC line 91. When the change rate is negative, fault determination unit 130 determines that a fault has occurred in power converter 5.

Based on the determination result of fault determination unit 130, output unit 140 outputs the information for protecting power converter 5 (and DC lines 91, 92). Specifically, when a fault has occurred in power converter 5 or DC lines 91, 92, output unit 140 outputs a stop command for stopping the operation of power converter 5 to power converter 5, thereby stopping the operation of power converter 5. Also, output unit 140 outputs an interruption command to circuit breaker 3 provided between AC system 2 and transformer 4, thereby protecting power converter 5 and DC lines 91, 92. More specifically, after output unit 140 outputs a stop command to power converter 5, it outputs an interruption command to circuit breaker 3. Alternatively, output unit 140 simultaneously outputs a stop command and an interruption command to power converter 5 and circuit breaker 3, respectively. Thereby, power converter 5 can be more reliably prevented from being damaged by a fault current.

When fault determination unit 130 determines that a fault has occurred in power converter 5 or DC lines 91, 92, notification unit 150 provides a notification about an abnormality. Specifically, notification unit 150 notifies an administrator or the like of protection device 10 about such an abnormality. Examples of the method for notification unit 150 to provide a notification about an abnormality may be: a method of turning on a notification light (not shown) provided in protection device 10; a method of generating a warning sound from a speaker (not shown); a method of displaying an abnormality message on a display unit (not shown) of protection device 10; and the like. Thereby, the administrator can immediately take measures of, for example, disconnecting power converter 5 from AC system 2, and the like.

<Processing Procedure>

Figure 6:
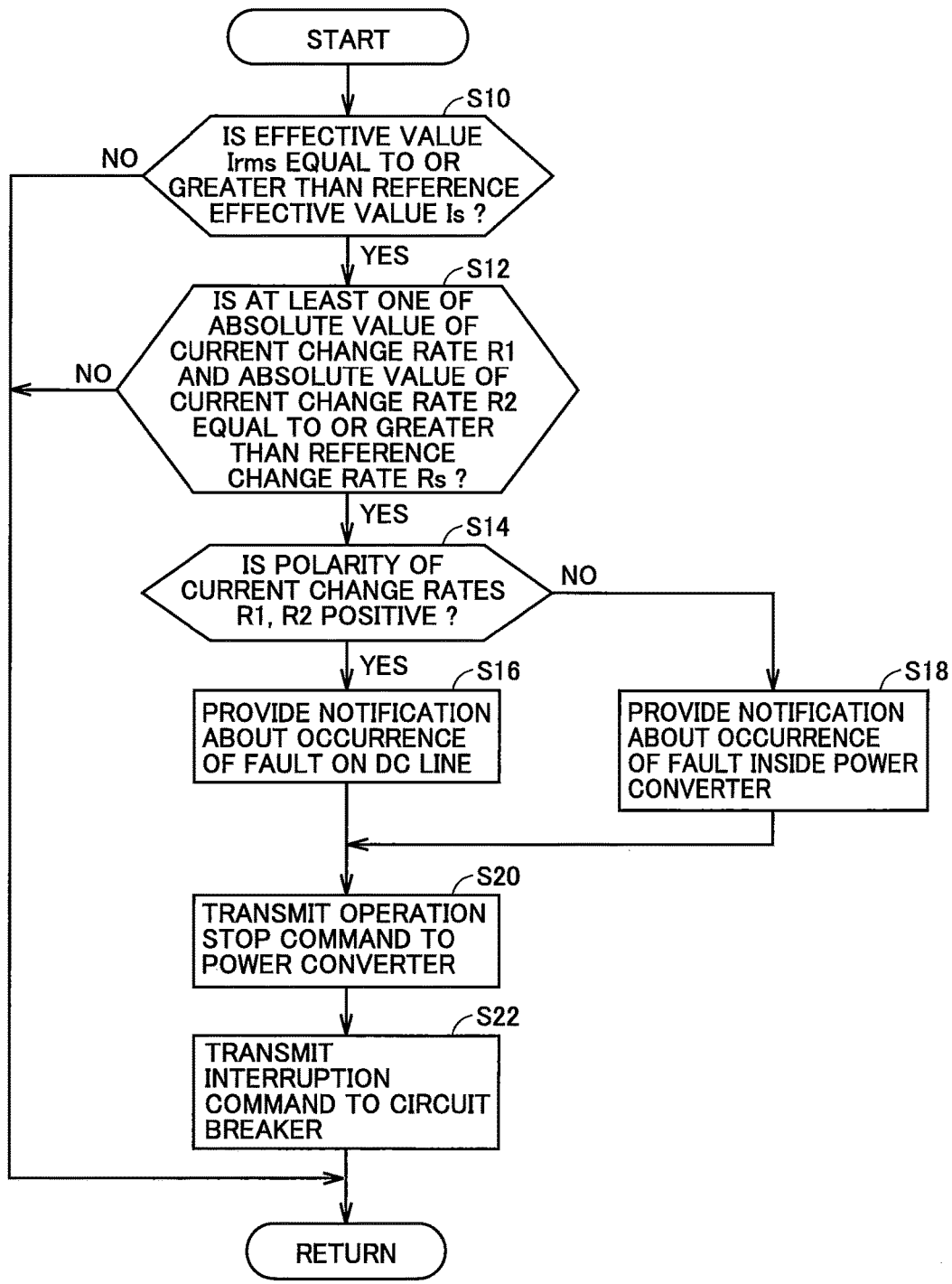
FIG. 6 is a flowchart illustrating a processing procedure of the protection device according to the present embodiment.

FIG. 6 is a flowchart illustrating a processing procedure of protection device 10 according to the present embodiment. Typically, each of the following steps can be implemented by a CPU of protection device 10 executing a program stored in a ROM. In addition, it is assumed that protection device 10 always monitors: the information transmitted from overcurrent relay 20 (in this case, effective value Irms of the AC current flowing between transformer 4 and power converter 5); and the information transmitted from each of current change rate relays 31 and 32 (in this case, current change rate R1 of the direct current between power converter 5 and DC line 91, and current change rate R2 of the direct current between power converter 5 and DC line 92). It is to be noted that a fault does not occur in DC line 92 in this case.

Referring to FIG. 6, protection device 10 determines whether effective value Irms is equal to or greater than reference threshold value Is or not (step S10). If effective value Irms is less than reference threshold value Is (NO in step S10), protection device 10 ends the process. On the other hand, if effective value Irms is equal to or greater than reference threshold value Is (YES in step S10), protection device 10 determines whether at least one of the absolute value of current change rate R1 and the absolute value of current change rate R2 is equal to or greater than reference change rate Rs or not (step S12).

If the absolute value of current change rate R1 and the absolute value of current change rate R2 is less than reference change rate Rs (NO in step S12), protection device 10 ends the process. On the other hand, if at least one of the absolute value of current change rate R1 and the absolute value of current change rate R2 is equal to or greater than reference change rate Rs (YES in step S12), protection device 10 determines whether the polarity of each of current change rates R1 and R2 is positive or not (step S14). If the polarity of each of current change rates R1 and R2 is positive (YES in step S14), protection device 10 determines that a fault has occurred in DC line 91 and provides a notification about occurrence of this fault (step S16). On the other hand, if the polarity of each of current change rates R1 and R2 is negative (NO in step S14), protection device 10 determines that a fault has occurred inside power converter 5 and provides a notification about occurrence of this fault (step S18).

Then, protection device 10 transmits an operation stop command to power converter 5 (step S20), transmits an interruption command to circuit breaker 3 (step S22), and then, ends the process. It is to be noted that protection device 10 may simultaneously perform the processes of step S20 and step S22.

<Application Example in Multi-Terminal DC Power Transmission System>

In the above description, an explanation has been given with regard to the configuration in which protection device 10 is applied to a power converter used in a two-terminal DC power transmission system, but the present invention is not limited this configuration. For example, protection device 10 can be applied also to a power converter used in a multi-terminal DC power transmission system in which three or more AC systems as shown in FIG. 7 are linked through a DC line.

Figure 7:
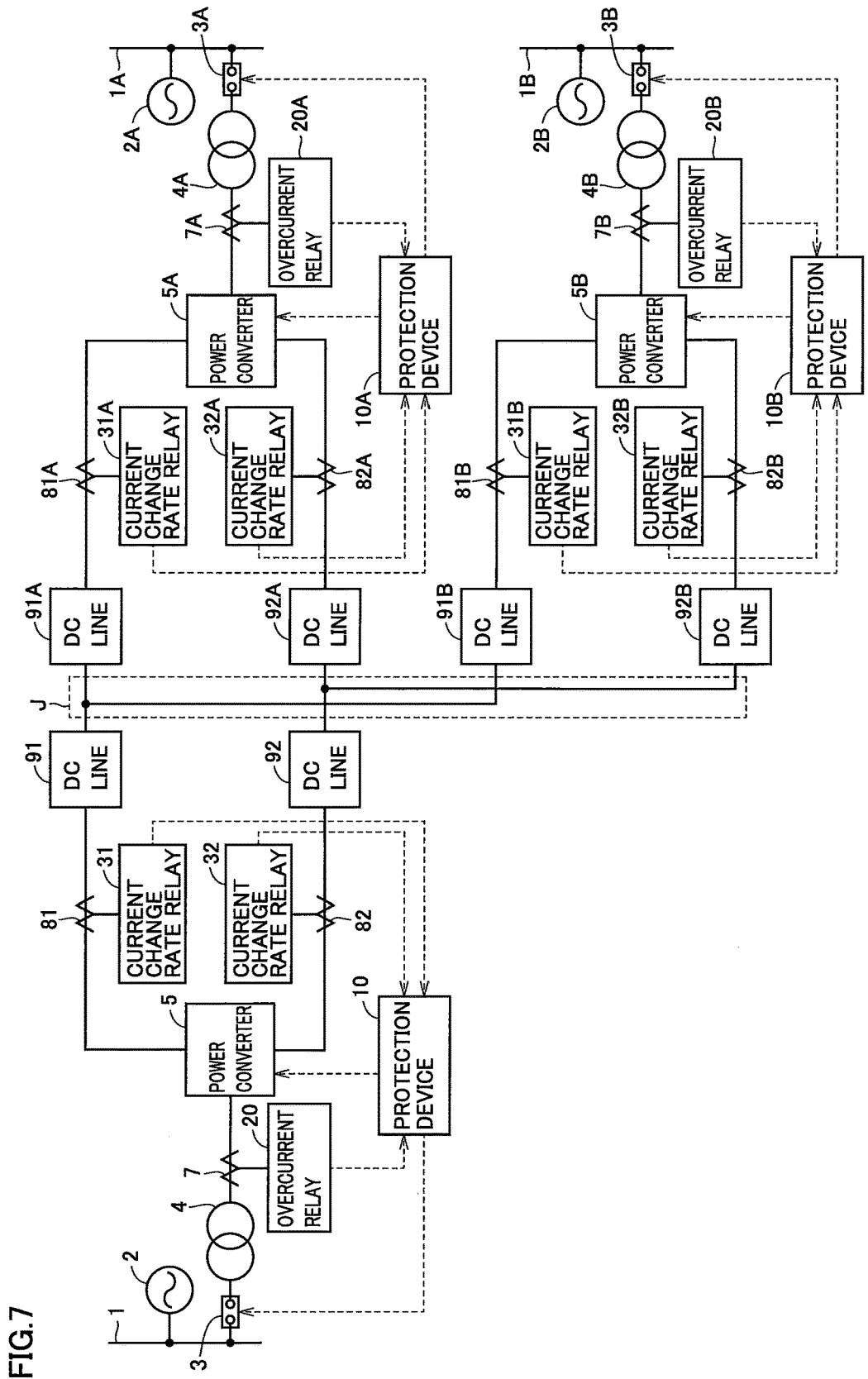
FIG. 7 is a diagram showing an example of a multi-terminal DC power transmission system to which the protection device according to the present embodiment is applied.

FIG. 7 is a diagram showing an example of a multi-terminal DC power transmission system to which protection device 10 according to the present embodiment is applied. Referring to FIG. 7, the multi-terminal DC power transmission system is herein provided as a three-terminal DC power transmission system in which AC systems 2, 2A and 2B respectively connected to AC buses 1, 1A and 1B are linked to one another through DC lines 91, 91A and 91B and through DC lines 92, 92A and 92B, respectively. At a branch point J, DC line 91 on the positive side is branched into a plurality of DC lines 91A and 91B while DC line 92 on the negative side is branched into a plurality of DC lines 92A and 92B.

In the above-described configuration, overcurrent relay 20A receives an input of the AC current value from a current detector 7A provided between transformer 4A and power converter 5A while current change rate relays 31A and 32A each receive an input of the voltage between the terminals in each of Rogowski coils 81A and 82A, respectively. Protection device 10A having the same function as that of protection device 10 determines based on the information transmitted from overcurrent relay 20A and current change rate relays 31A and 32A whether a fault has occurred or not in one of power converter 5A and DC lines 91A, 92A. If a fault has occurred, protection device 10A transmits an operation stop command to power converter 5A, and then, transmits an interruption command to circuit breaker 3A.

Also similarly, overcurrent relay 20B receives an input of the AC current value from current detector 7B provided between transformer 4B and power converter 5B while current change rate relays 31B and 32B each receive an input of the voltage between the terminals in each of Rogowski coils 81B and 82B, respectively. Protection device 10B having the same function as that of protection device 10 determines based on the information transmitted from overcurrent relay 20B and current change rate relays 31B, 32B whether a fault has occurred or not in one of power converter 5B and in DC lines 91B, 92B. If a fault has occurred, protection device 10B transmits an operation stop command to power converter 5B, and then, transmits an interruption command to circuit breaker 3B.

As described above, a protection device is applied to a multi-terminal DC power transmission system, so that a fault in each power converter and each DC line can be speedily detected. Accordingly, it becomes possible to separate only the power converter or the DC line in which a fault has occurred. Thus, DC power transmission can be implemented only using a sound power converter and a sound DC line immediately after occurrence of a fault.

<Advantages>

According to the present embodiment, a fault can be removed in the earlier stage by speedily and accurately detecting occurrence of a fault in the power converter and the DC line. Thus, the power converter can be prevented from being damaged by a fault current.

According to the present embodiment, since it can be determined whether a fault has occurred in the power converter or in the DC line, it becomes possible to take appropriate measures after occurrence of a fault.

According to the present embodiment, a Rogowski coil is used for detecting the change rate of the direct current, so that a fault can be determined speedily. Thus, even in the case of a self-excited power converter showing a sharp rise of a current upon occurrence of a fault, damage caused by a fault current can be reliably prevented. In addition, a separately-excited power converter showing a gradual rise of a current upon occurrence of a fault can also be protected from damage caused by a fault current.

Other Embodiments

In the above-described embodiment, an explanation has been given with regard to the configuration in which protection device 10 receives, through overcurrent relay 20, the information showing the AC current value obtained between transformer 4 and power converter 5 and also receives, through current change rate relays 31 and 32, the information showing the change rate of the direct current flowing between power converter 5 and DC lines 91, 92. The present invention however is not limited to this configuration. For example, protection device 10 may directly receive the AC current value detected in current detector 7 without using overcurrent relay 20. Protection device 10 may directly receive an input of the voltage between the terminals in each of Rogowski coils 81 and 82 without using current change rate relays 31 and 32, so as to detect the change rate of the direct current. Furthermore, protection device 10 may be configured to have functions of overcurrent relay 20 and current change rate relays 31, 32.

In the above-described embodiment, an explanation has been given with regard to the configuration in which two Rogowski coils including Rogowski coils 81 and 82 are used, but the configuration formed using Rogowski coil 81 or Rogowski coil 82 may be applied. For example, when only Rogowski coil 81 is used, protection device 10 performs the above-described process using only current change rate R1 derived from the voltage between the terminals in Rogowski coil 81.

In the above-described embodiment, an explanation has been given with regard to the configuration in which power converter 5 is a self-excited power converter, but a separately-excited power converter may also be applied.

In the above-described embodiment, an explanation has been given with regard to the configuration in which a multi-terminal DC power transmission system is a three-terminal DC power transmission system, but a four or more-terminal DC power transmission system may also be applied.

The configuration illustrated as an embodiment described above, which is merely an example of the configuration of the present invention, can be combined with another known technique or can also be configured by modification such as partial omission within a scope not deviating from the feature of the present invention.

Also in the above-described embodiment, the processes and the configurations described in other embodiments may be employed as appropriate for implementation.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1, 1A, 1B AC bus, 2, 2A, 2B AC system, 3, 3A, 3B circuit breaker, 4, 4A, 4B transformer, 5, 5A, 5B power converter, 7, 7A, 7B current detector, 10, 10A, 10B protection device, 20, 20A, 20B overcurrent relay, 31, 31A, 31B, 32, 32A, 32B current change rate relay, 81, 81A, 81B, 82, 82A, 82B Rogowski coil, 91, 91A, 91B, 92, 92A, 92B DC line, 110 current input unit, 120 current change rate input unit, 130 fault determination unit, 140 output unit, 150 notification unit.

The invention claimed is:

1. A protection device for a power converter provided between a DC line forming a DC power transmission system and an AC system, the protection device comprising:
   a current input unit configured to receive an input of an AC current value obtained between a transformer connected to the AC system and the power converter capable of converting AC power into DC power;
   a current change rate input unit configured to receive an input of a change rate of a direct current detected by an air core coil provided between the DC line and the power converter, the DC line receiving DC power from the power converter;
   a fault determination unit configured to determine whether a fault occurs or not in one of the power converter and the DC line, based on the AC current value received by the current input unit and the change rate received by the current change rate input unit; and
   an output unit configured to output information for protecting the power converter based on a determination result of the fault determination unit.

2. The protection device according to claim 1, wherein when the AC current value is equal to or greater than a reference threshold value and when the change rate is equal to or greater than a reference change rate, the fault determination unit is configured to determine that a fault occurs in the power converter or the DC line.

3. The protection device according to claim 1, wherein the fault determination unit is configured to determine based on a polarity of the change rate whether a fault occurs in the power converter or the DC line.

4. The protection device according to claim 1, wherein when a fault occurs in the power converter or the DC line, the output unit is configured to output an interruption command to a circuit breaker provided between the AC system and the transformer.

5. The protection device according to claim 1, wherein when a fault occurs in the power converter or the DC line, the output unit is configured to output, to the power converter, a stop command for stopping an operation of the power converter.

6. The protection device according to claim 1, wherein the power converter includes a self-excited power converter.

7. The protection device according to claim 1, wherein the DC power transmission system includes a multi-terminal DC power transmission system in which three or more AC systems are linked through the DC line.

8. A protection system for a DC power transmission system, the protection system comprising:
   a power converter capable of converting AC power from a transformer connected to an AC system into DC power and supplying the DC power to a DC line forming the DC power transmission system; and
   a protection device for protecting the power converter, the protection device including
      a current input unit configured to receive an input of an AC current value obtained between the transformer and the power converter,
      a current change rate input unit configured to receive an input of a change rate of a direct current detected by an air core coil provided between the DC line and the power converter,
      a fault determination unit configured to determine whether a fault occurs or not in one of the power converter and the DC line, based on the AC current value received by the current input unit and the change rate received by the current change rate input unit, and
      an output unit configured to output information for protecting the power converter based on a determination result of the fault determination unit.

* * * * *